(12) United States Patent
Peterson et al.

(10) Patent No.: US 8,176,811 B2
(45) Date of Patent: May 15, 2012

(54) RIBBED COVER FOR DRIVE AXLE HOUSING

(75) Inventors: Glen Peterson, Portage, MI (US); Leo Wenstrup, Portage, MI (US); Matthew Neff, Battle Creek, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 1960 days.

(21) Appl. No.: 10/903,121

(22) Filed: Jul. 30, 2004

(65) Prior Publication Data

US 2006/0021463 A1 Feb. 2, 2006

(51) Int. Cl.
*F16H 57/02* (2006.01)
*F16H 57/04* (2006.01)
*F16H 61/00* (2006.01)

(52) U.S. Cl. ........................ 74/606 R; 74/607

(58) Field of Classification Search ........... 74/606 R, 74/607; 180/346; 188/1.11 E; 60/487; B60K 17/36
See application file for complete search history.

(56) References Cited

U.S. PATENT DOCUMENTS

| | | | |
|---|---|---|---|
| 2,478,180 A * | 8/1949 | Buckendale | 74/607 |
| 4,625,581 A | 12/1986 | Hull | |
| D327,280 S | 6/1992 | Macomber | |
| 5,294,350 A | 3/1994 | Murphy et al. | |
| 5,620,388 A | 4/1997 | Schlegelmann et al. | |
| 5,713,247 A | 2/1998 | Skelton et al. | |
| 5,976,050 A | 11/1999 | Irwin | |
| 6,618,924 B1 | 9/2003 | Irwin | |
| 6,796,404 B1 * | 9/2004 | Dick et al. | 188/1.11 E |
| 7,004,277 B2 * | 2/2006 | Pollock et al. | 180/346 |
| 2001/0005989 A1 * | 7/2001 | Hauser et al. | 60/487 |

FOREIGN PATENT DOCUMENTS

| | | | |
|---|---|---|---|
| EP | 001352771 A2 * | 10/2003 | |
| GB | 1041106 | | 9/1966 |
| GB | 1403730 | * | 8/1975 |
| JP | 8-058413 | | 3/1996 |

OTHER PUBLICATIONS

International Search Report issued in corresponding International Patent Application No. PCT/US2005/020454 (Sep. 13, 2005).
Written Opinion issued in corresponding International Patent Application No. PCT/US2005/020454 (Sep. 13, 2005).
English language abstract of JP 8-058413.

* cited by examiner

*Primary Examiner* — Vinh T. Luong
(74) *Attorney, Agent, or Firm* — Marshall & Melhorn LLC

(57) ABSTRACT

A rear cover for a drive axle housing is provided that minimizes stresses in the weld joining the output shaft bearing tube to the rear cover. In one embodiment, the rear cover includes a stiffening rib extending transversely across part or all of the cover. In another embodiment, the rear cover includes a raised portions proximate the output shaft bearing tube that is substantially spherical in shape.

18 Claims, 4 Drawing Sheets

RIBBED COVER FOR DRIVE AXLE HOUSING

BACKGROUND OF THE INVENTION

1. Field of the Invention

This invention relates to drive axle housings and, in particular, to a drive axle housing included a ribbed rear cover for additional strength.

2. Discussion of Related Art

A conventional tandem drive axle assembly includes forward and rear drive axle assemblies. Each of the forward and rear drive axle assemblies includes a housing from which a pair of axle shafts extend to rotatably support one or more ground engaging wheels on opposites sides of a vehicle. The housing for each drive axle assembly further includes a wheel differential to enable the wheels at either end of the axle to rotate at different speeds. The forward axle assembly also typically includes an inter-axle differential that divides power between the forward and rear drive axle assemblies. The inter-axle differential provides power to the rear drive axle assembly through an output shaft that extends outwardly through an aperture in a rear cover of the housing for the forward drive axle assembly. A tube may be disposed within the aperture and bearings may be disposed within the tube to rotatably support the output shaft. The tube is typically coupled to the rear cover of the axle housing with one or more welds.

The above-identified drive axle assembly suffers from a significant drawback. In particular, the welds coupling the tube to the rear cover of the drive axle housing are subject to stress and ultimately failure.

The inventors herein have recognized a need for a drive axle assembly that will minimize and/or eliminate one or more of the above-identified deficiencies.

SUMMARY OF THE INVENTION

The present invention provides a drive axle assembly having an improved rear housing cover.

A drive axle assembly in accordance with the present invention includes a housing including a cover disposed at a first end. The assembly further includes an input shaft extending into the housing and a plurality of differential gears driven in response to the input shaft. The assembly further includes first and second side gears driven in response to the plurality of differential gears. A wheel differential is driven in response to the first side gear and the wheel differential includes a pinion gear and a ring gear. The assembly further includes an output shaft coupled to the second side gear for rotation therewith. The cover defines a first protrusion configured to receive a portion of the ring gear, an aperture disposed on a first side of the first protrusion through which the output shaft extends, and a second protrusion also disposed on the first side of the first protrusion.

A drive axle assembly in accordance with the present invention is a significant improvement over conventional drive axle assemblies. The cover in the housing is designed to provide additional strength to the cover so that flexing of the cover is minimized. As a result, stress on the welds coupling the output shaft bearing tube to the rear cover are reduced and/or eliminated.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
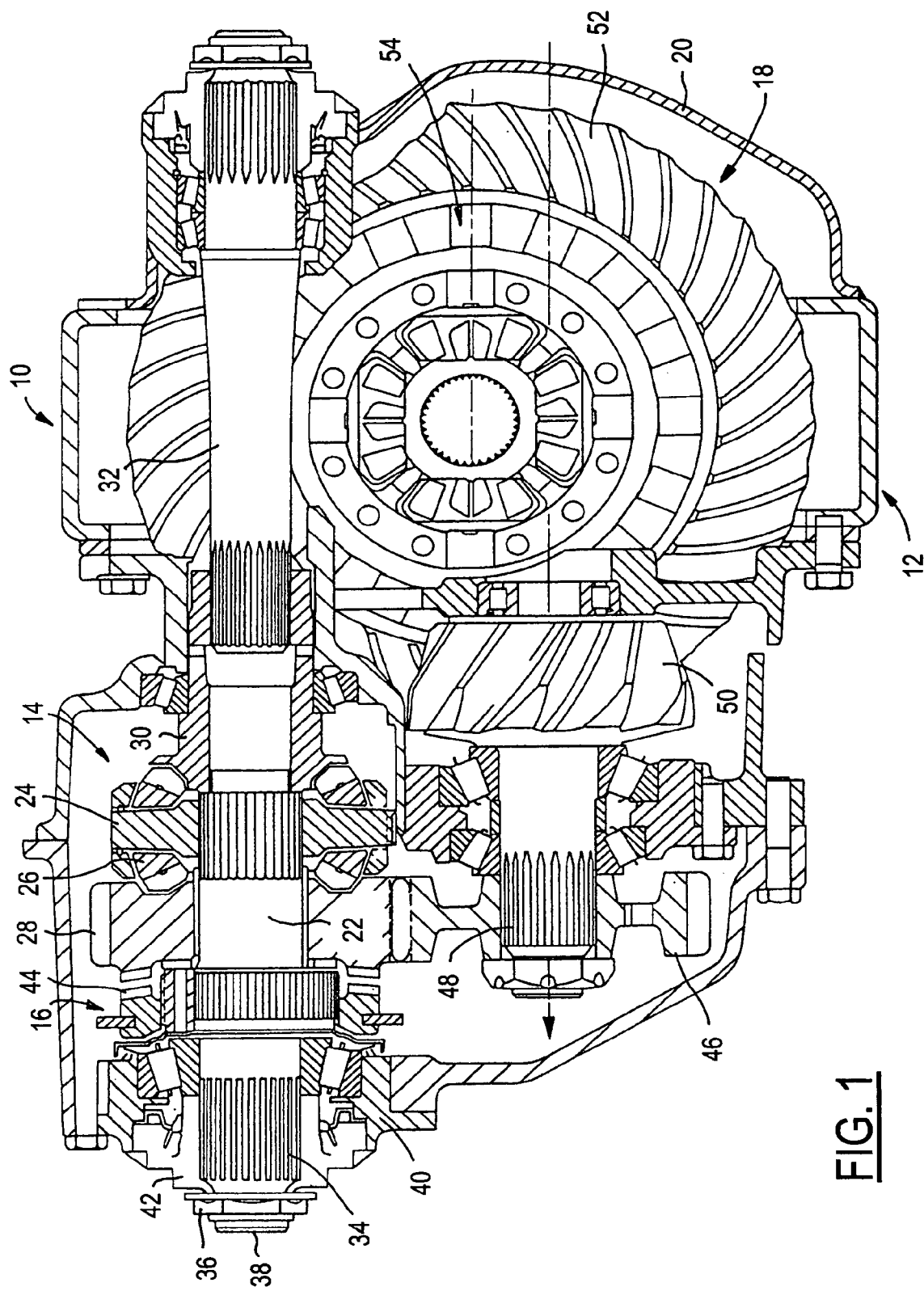
FIG. 1 is a cross-sectional view of a drive axle assembly in accordance with one embodiment of the present invention.
Figure 2:
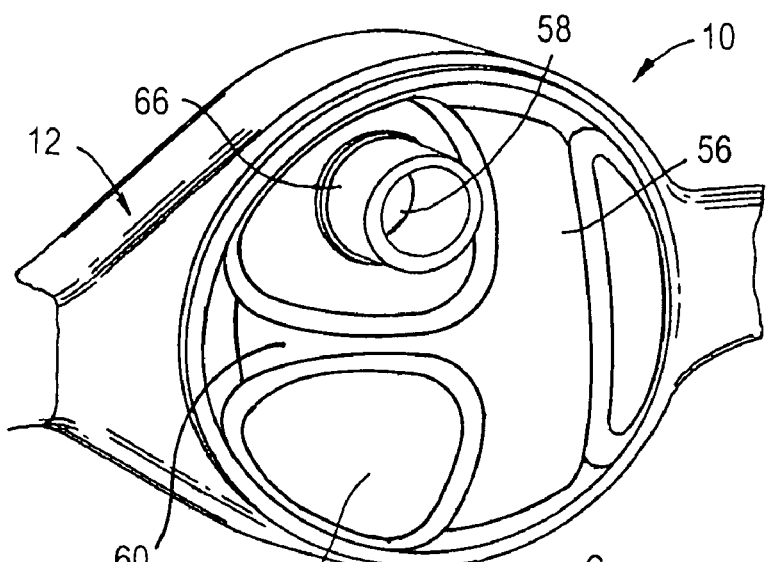
FIG. 2 is a perspective view of the drive axle assembly of FIG. 1.

Referring now to the drawings wherein like reference numerals are used to identify identical components in the various views, FIG. 1 illustrates a drive axle assembly 10 in accordance with the present invention. Assembly 10 is particularly adapted for use in medium and heavy trucks. It should be understood, however, that the present invention is not limited to use in medium or heavy trucks and may be used in a wide variety of vehicles and non-vehicular applications. Assembly 10 may comprise the forward drive axle assembly of a tandem drive axle assembly. Assembly 10 is provided to drive wheels (not shown) supported on either side of assembly 10 on axle half shafts (not shown) extending from axle assembly 10. Assembly 10 may include a housing 12, an inter-axle differential 14 for dividing power between another drive axle assembly (not shown) and the assembly 10, a clutch 16, and a wheel differential assembly 18.

Housing 12 provides structural support for the other components of assembly 10. Housing 12 also protects the other components of assembly 10 from foreign objects and elements. Housing 12 may be made from conventional metals and metal alloys such as steel and may include multiple members that are sized relative to components of assembly 10 and coupled together using conventional fasteners. One member of housing 12 may comprise a cover 20 disposed at one end of housing 12.

Inter-axle differential 14 is provided to divide power between the axle assembly 10 and another axle assembly (not shown). Differential 14 may include an input shaft 22, a spider 24, differential gears 26, side gears 28, 30, and an output shaft 32.

Input shaft 22 is provided to transmit power from a power input shaft (not shown) at the forward end of assembly 10 to spider 24 and differential gears 26 and is conventional in the art. Input shaft 22 is driven by the power input shaft through a conventional input yoke (not shown). The input yoke may be splined to the forward end of input shaft 22 on splines 34 and may be retained thereon by a nut 36 and a washer which are disposed about a threaded stud 38 that extends from the forward end of shaft 22 and is integral therewith. A dust cap 40 and a seal 42 are disposed about the input yoke (not shown) and are received within an opening in housing 12.

Spider 24 provides a mounting arrangement for differential gears 26 and is conventional in the art. Spider 24 is supported on input shaft 22 and may be coupled to input shaft 22 for rotation therewith using a spline connection or in other ways customary in the art. Alternatively, spider 24 may be made integral with input shaft 22.

Differential gears 26 are provided to drive and transfer torque from input shaft 22 to gears 28, 30. Gears 26 are conventional in the art and may be made from conventional metals and metal alloys. Gears 26 are coupled to spider 24 for rotation with spider 24 and input shaft 22. The teeth on gears 26 engage corresponding teeth on gears 28, 30.

Gear 28 transfers torque from differential pinion gears 26 to wheel differential assembly 18. Gear 28 is conventional in the art and may be made from conventional metal and metal alloys. Gear 28 is disposed about input shaft 22 and is freely rotatable thereon, being journalled on the shaft by bushings (not shown). Gear 28 includes a first set of teeth on a forward planar surface which form a first member of clutch 16 and a second set of teeth disposed on a rear planar surface that mesh with the teeth of differential gears 26. Gear 28 further includes a third set of teeth disposed about the radial periphery of gear 28 for engagement with a corresponding driven gear in the wheel differential assembly 18.

Gear 30 transfers torque from differential pinion gears 26 to output shaft 32. Gear 30 is conventional in the art and may be made from conventional metal and metal alloys. Gear 30 is disposed about output shaft 32 near the forward end of shaft 32 and may be coupled thereto by mating splines (not shown) on gear 30 and shaft 32. Alternatively, gear 30 may be integral with shaft 32. Gear 30 is journalled for rotation within housing 12 by a tapered roller bearing.

Output shaft 32 is provided to transmit a portion of the power provided by input shaft 22 to another drive axle assembly (not shown). Shaft 32 may be coaxially disposed relative to input shaft 22 and extends outwardly from gear 30. Shaft 32 rotates with gear 30. Shaft 32 extends through an aperture in cover 20 of housing 12 as described in more detail hereinbelow and is journalled within housing 12 by bearings.

Clutch 16 is provided to selectively lock differential 14 and is conventional in the art. Clutch 16 may comprise a conventional sliding dog clutch that may be engaged by shifting a clutch member 44 with a first set of teeth into engagement with a clutch member (side gear 28 in the illustrated embodiment) having a second set of teeth using a shifting fork or other actuator.

Wheel differential assembly 18 is provided to transfer torque from input shaft 22 to vehicle wheels (not shown) and to allow the wheels to rotate at different speeds. Assembly 18 is conventional in the art and may include a driven gear 46, a pinion shaft 48, a pinion gear 50, a ring gear 52, and a conventional bevel gear set 54.

Driven gear 46 is provided to transfer torque from side gear 28 to pinion shaft 48. Driven gear 46 may comprise a helical gear having teeth disposed about its radial periphery which engage corresponding teeth on gear 28. Gear 46 may be drivingly coupled to shaft 48 through axially-extending splines on shaft 48.

Pinion shaft 48 transmits torque to pinion gear 50 and is conventional in the art. Shaft 48 is supported for rotation within housing 12 by bearings. A forward end of shaft 48 may define an integral threaded shank configured to receive a nut to retain gear 46 on shaft 48. A rear end of shaft 48 is configured to receive pinion gear 50 thereon.

Pinion gear 50 transmits torque to ring gear 52 and is also conventional in the art. Pinion gear 50 may comprise a hypoid gear and may be coupled to shaft 48 using a spline connection or in other ways customary in the art or may be integral with pinion shaft 48.

Ring gear 52 transmits torque to differential gear set 54. Ring gear 52 is conventional in the art any may also comprise a hypoid gear. Ring gear 52 is in mesh with pinion gear 50 and may be coupled to, or integral with, a differential case in which gear set 54 is mounted.

Differential gear set 54 enables the wheels (not shown) on opposite sides of drive axle assembly 10 to rotate at different speeds. Gear set 54 is conventional in the art and may include a plurality of bevel gears mounted on the arms of a spider (not shown) within a differential case driven by ring gear 52.

Figure 3:
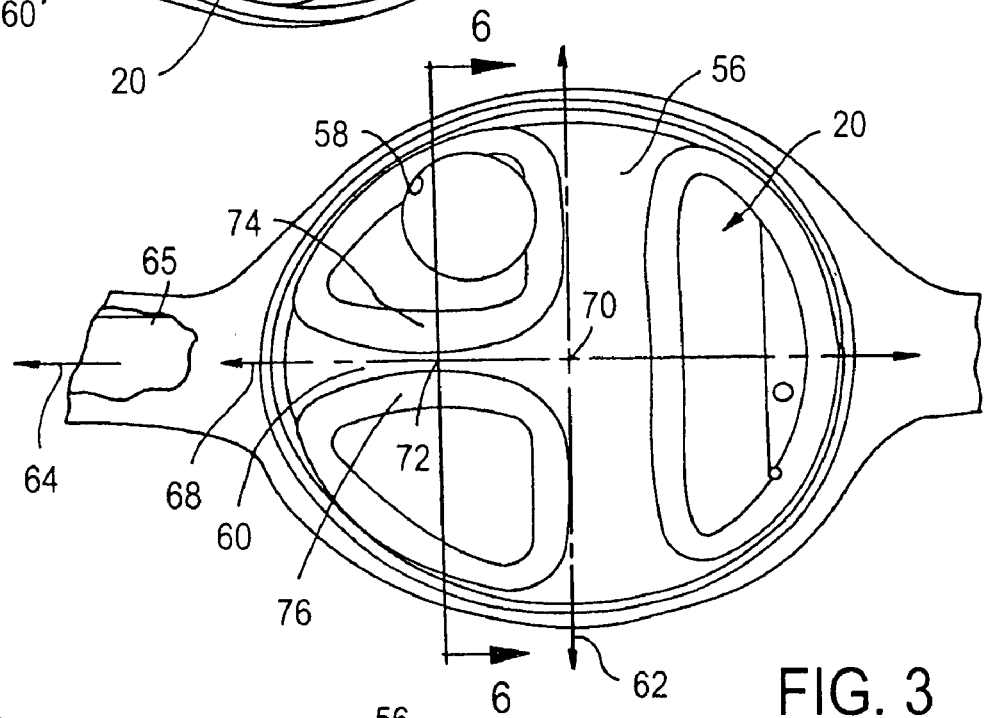
FIG. 3 is a plan view of the cover of the housing of the drive axle assembly of FIGS. 1-2.
Figure 4:
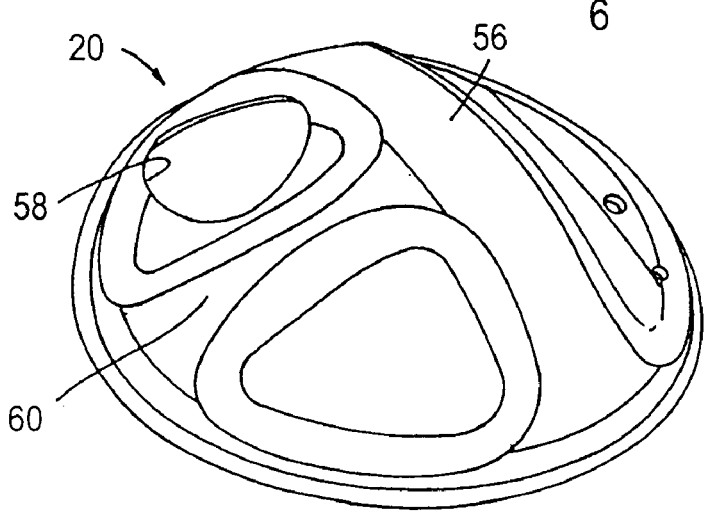
FIG. 4 is a perspective view of the cover of the housing of the drive axle assembly of FIGS. 1-2.
Figure 5:
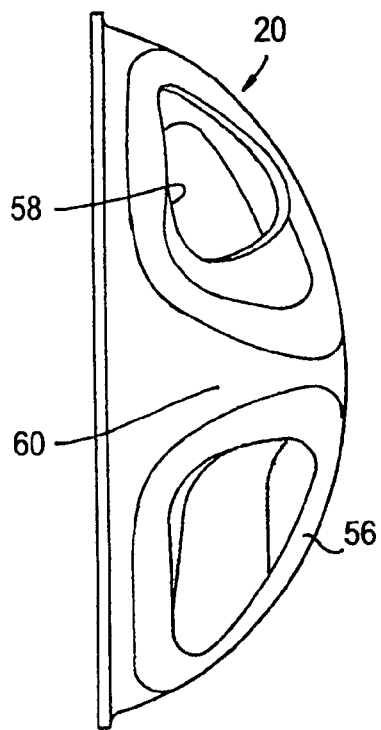
FIG. 5 is a plan view of the cover of the housing of the drive axle assembly of FIGS. 1-2.
Figure 6:
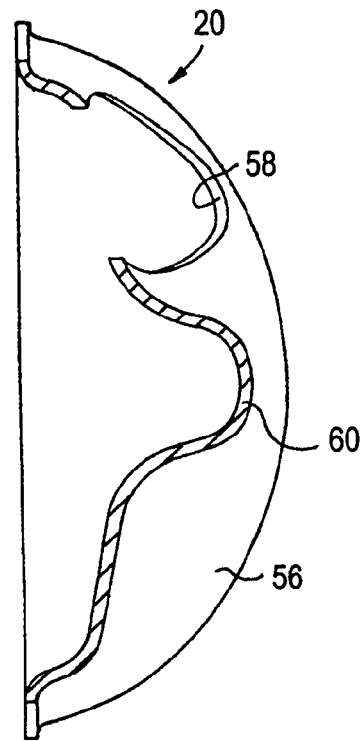
FIG. 6 is a cross-sectional view of the cover of the housing of the drive axle assembly of FIGS. 1-4 as taken along lines 6-6 of FIG. 3.

Referring now to FIGS. 2-6, cover 20 will be described in greater detail. Cover 20 is provided as a part of housing 12 to enclose the rearward side of assembly 10. Cover 20 may be made from conventional metals and metal alloys such as steel. Cover 20 is coupled to the other members of housing 12 using conventional fasteners such as welds. Referring to FIG. 4, cover 20 is substantially spherical (or hemispherical) in shape. Cover 20 defines a first protrusion 56, an aperture 58 and a second protrusion 60.

Protrusion 56 is configured to receive a portion of ring gear 52 as ring gear 52 rotates within housing 12. Protrusion 56 extends outwardly from cover 20 and extends generally vertically relative to an axis defining a longitudinal axis 62 as shown in FIG. 3 that is generally perpendicular to the axial centerline 64 of an axle shaft 65 extending from housing 12.

Aperture 58 provides an outlet through which output shaft 32 extends to transmit power to another drive axle assembly (not shown). Aperture 58 is disposed on one side of protrusion 56 and is sized to receive a tube 66 that surrounds output shaft 32. Tube 66 is generally cylindrical in shape and may be made from conventional metals and metal alloys. Tube 66 is disposed within aperture 58 and may be coupled to cover 20 through one or more welds. Tube 66 may support bearings allowing relative rotation of shaft 32 within tube 66 in a conventional manner.

Protrusion 60 provides additional structural strength to cover 20 to minimize flexing of cover 20 and reduce stress on the welds coupling tube 66 to cover 20. Protrusion 60 is disposed on the same side of protrusion 56 as aperture 58. Protrusion 60 may be substantially perpendicular to protrusion 56 with a longitudinal axis 68 of protrusion 60 intersecting a midpoint 70 of axis 62 of protrusion 56. Axis 68 may also intersect a lateral midpoint 72 of protrusion 60 as determined by the vertical distance from one side 74 of protrusion 60 to an opposite side 76 of protrusion 60. Axis 68 may also be substantially parallel to axis 64 (i.e., the axial centerline of an axle shaft (not shown) extending from housing 12). Protrusion 60 may taper moving inwardly from either longitudinal end of protrusion 60 and protrusion 60 may be at its widest proximate one or both longitudinal ends of protrusion 60. Protrusion 60 may also intersect with protrusion 56.

Figure 7:
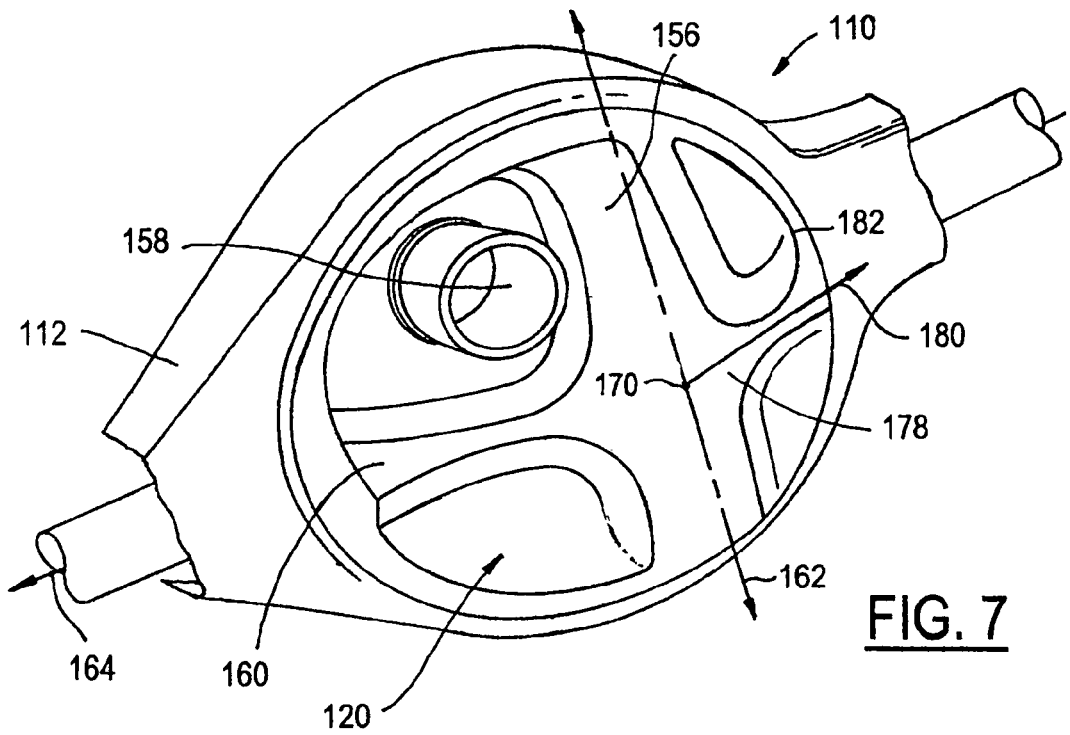
FIG. 7 is a perspective view of a drive axle assembly in accordance with a second embodiment of the present invention.
Figure 8:
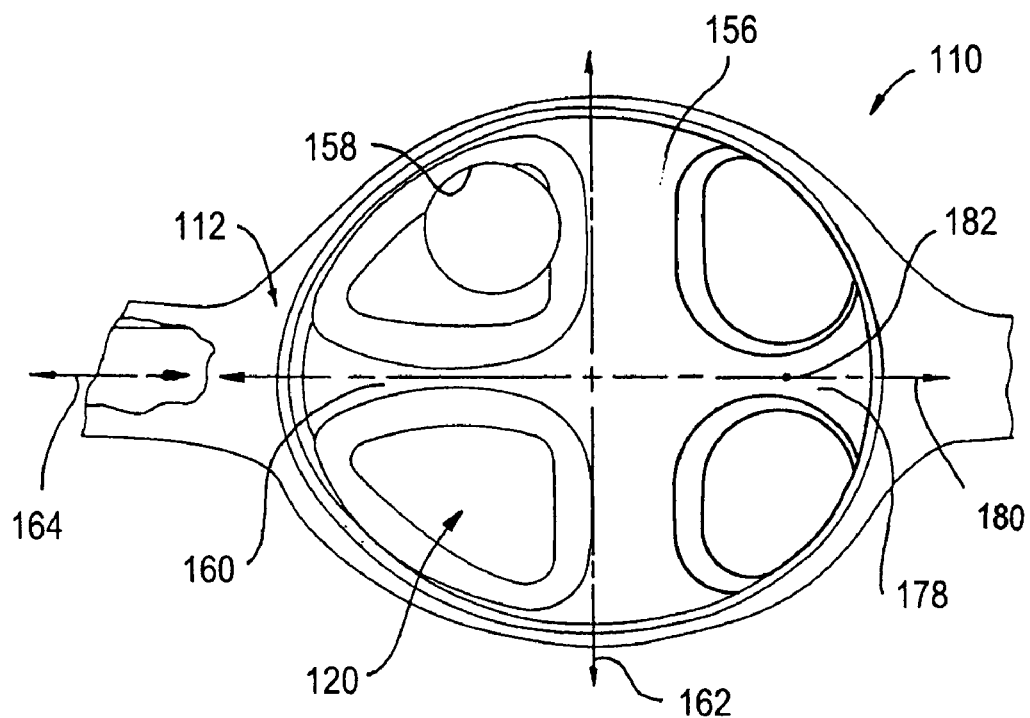
FIG. 8 is a plan view of the drive axle assembly of FIG. 7.

Referring now to FIGS. 7-8, a drive axle assembly 110 in accordance with a second embodiment of the present invention is illustrated Assembly 110 may be identical to assembly 10 with the exception that cover 120 differs from cover 20. Cover 120 is substantially similar to cover 20 and includes a first protrusion 156, an aperture 158 and a second protrusion 160 that are substantially similar to protrusion 56, aperture 58, and protrusion 60 in cover 20. Reference to a description of these portions of cover 120 may therefore be found hereinabove. Cover 120 further defines a third protrusion 178. Protrusion 178 is disposed on a side of protrusion 156 opposite aperture 158 and protrusion 160. Protrusion 178 may be substantially perpendicular to protrusion 156 with a longitudinal axis 180 of protrusion 178 intersecting a midpoint 170 of axis 162 of protrusion 156. Axis 180 may also intersect a lateral midpoint 182 of protrusion 178 as determined by the vertical distance from one side of protrusion 178 to an opposite side of protrusion 178. Axis 180 may also be substantially parallel to axis 164 (i.e., the axial centerline of an axle shaft (not shown) extending from housing 112). Protrusion 178 may also taper moving inwardly from either longitudinal end of protrusion 178 and protrusion 178 may be at its widest proximate one or both longitudinal ends of protrusion 178. Protrusion 178 may also intersect with protrusion 156.

Figure 9:
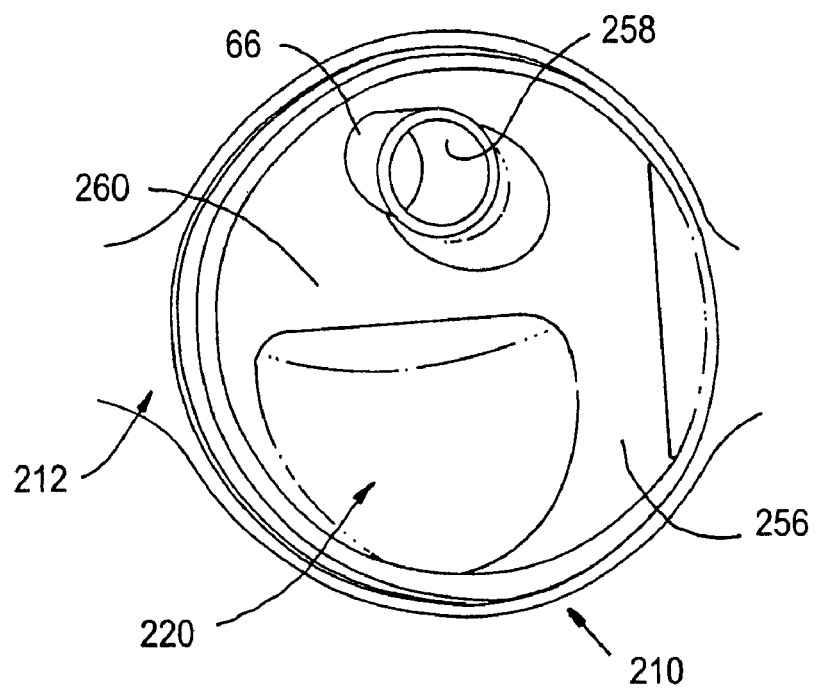
FIG. 9 is a perspective view of a drive axle assembly in accordance with a third embodiment of the present invention.

Referring now to FIG. 9, a drive axle assembly 210 in accordance with a third embodiment of the present invention is illustrated. Assembly 210 may be identical to assembly 10 with the exception that cover 220 differs from cover 20. Cover 220 is substantially similar to cover 20 and includes a first protrusion 256 and an aperture 258 that are substantially similar to protrusion 56 and aperture 58 in cover 20. Reference to a description of these portions of cover 220 may therefore be found hereinabove. Cover 220 also contains a second protrusion 260. Protrusion 260 is disposed on the same side of protrusion 256 on which aperture 258 is disposed. Protrusion 260 is substantially spherical in shape, extending further rearwardly moving inwardly from the edge of cover 220 towards the center of cover 220. With the exception of the area proximate aperture 258, therefore, approximately one quarter of cover 220 (or approximately one half of cover 220 on one side of protrusion 256) retains a domed shape. Protrusion 260 may be disposed about more than half of aperture 258. In this manner cover 220 retains sufficient strength to prevent flexing of cover 220 and stress on the welds coupling tube 266 to cover 220.

A drive axle assembly in accordance with the present invention represents an improvement as compared to conventional drive axle assemblies. In particular the cover 20, 120 or 220 of the drive axle assembly is strengthened to prevent flexing of the cover and undue stress on the welds coupling the output shaft bearing tube to the cover.

While the invention has been shown and described with reference to one or more particular embodiments thereof, it will be understood by those of skill in the art that various changes and modifications can be made without departing from the spirit and scope of the invention.

We claim:

1. A drive axle assembly, comprising:
    a housing including a cover disposed at a first end;
    an input shaft extending into said housing;
    a plurality of differential gears driven in response to said input shaft;
    first and second side gears driven in response to said plurality of differential gears;
    a wheel differential driven in response to said first side gear, said wheel differential including a pinion gear and a ring gear;
    an output shaft coupled to said second side gear for rotation therewith
    wherein said cover defines a first protrusion configured to receive a portion of said ring gear, an aperture disposed on a first side of said first protrusion through which said output shaft extends, and a second protrusion disposed on said first side of said first protrusion.

2. The drive axle assembly of claim 1, further comprising a tube disposed within said aperture and coupled to said cover, said tube surrounding said output shaft.

3. The drive axle assembly of claim 1 wherein said second protrusion is perpendicular to said first protrusion.

4. The drive axle assembly of claim 1 wherein a longitudinal axis of said second protrusion intersects a midpoint of a longitudinal axis of said first protrusion.

5. The drive axle assembly of claim 4 wherein said longitudinal axis of said second protrusion intersects a lateral midpoint of said second protrusion.

6. The drive axle assembly of claim 1 wherein a longitudinal axis of said second protrusion is parallel to an axial centerline of an axle shaft extending from said housing.

7. The drive axle assembly of claim 6 wherein said longitudinal axis of said second protrusion intersects a lateral midpoint of said second protrusion.

8. The drive axle assembly of claim 1 wherein said second protrusion intersects said first protrusion.

9. The drive axle assembly of claim 1 wherein said cover defines a third protrusion disposed on a second side of said first protrusion opposite said first side.

10. The drive axle assembly of claim 9 wherein said second and third protrusions intersect said first protrusion.

11. The drive axle assembly of claim 1 wherein said second protrusion tapers moving inwardly from either longitudinal end of said second protrusion.

12. The drive axle assembly of claim 1 wherein said second protrusion is widest at one of first and second longitudinal ends of said second protrusion.

13. The drive axle assembly of claim 1 wherein said second protrusion is disposed about more than half of a perimeter of said aperture.

14. The drive axle assembly of claim 1 wherein said second protrusion is spherical in shape.

15. The drive axle assembly of claim 14 wherein said second protrusion intersects said first protrusion.

16. The drive axle assembly of claim 1 wherein said cover is disposed on an opposite side of an axle shaft extending from said housing relative to said pinion gear.

17. The drive axle assembly of claim 1 wherein said first and second protrusions protrude in a direction away from said pinion gear.

18. The drive axle assembly of claim 1 wherein said first protrusion has a longitudinal axis that is perpendicular to an axial centerline of an axle shaft extending from said housing.

* * * * *